United States Patent [19]
Woltering

[11] 4,280,368
[45] Jul. 28, 1981

[54] DEVICES FOR PRODUCING VIBRATORY FORCES

[76] Inventor: Howard M. Woltering, Rte. 2, Box 454, Foster, Ky. 41043

[21] Appl. No.: 89,605

[22] Filed: Oct. 29, 1979

[51] Int. Cl.³ .......................... B06B 1/16; B65G 27/20
[52] U.S. Cl. .......................................... 74/61; 74/831
[58] Field of Search ...................... 74/61, 87, 828, 831, 74/832; 173/49; 198/770; 209/366.5, 367; 366/128; 404/117

[56] References Cited

U.S. PATENT DOCUMENTS
3,433,311  3/1969  Lebelle ................................. 173/49

FOREIGN PATENT DOCUMENTS
448658  8/1927  Fed. Rep. of Germany .............. 74/61
882939  11/1961  United Kingdom ...................... 74/61

*Primary Examiner*—Lawrence J. Staab
*Attorney, Agent, or Firm*—Edmund S. Lee, III

[57] ABSTRACT

The device for producing vibratory forces shown in the drawings comprises a pair of plates mounted on a structural frame. There are three rows of gears on each plate which are intermeshed so that all may be driven from a drive input to one of the gears in the central row. Drive means provide the input to the driven gear of each plate through one of the journals for mounting the plates on the frames. Weights are mounted eccentrically on each of the gears and are thus rotated synchronously between extreme outward and inward positions to produce, by centrifugal force, vibratory forces parallel to the planes of the plates. Means, operative through the other journals for pivotal mounting the plates, simultaneously and synchronously pivot the plates between aligned positions wherein the centrifugal forces are nullified and essentially no vibrations are produced and parallel positions wherein the vibratory forces are at maximum.

8 Claims, 7 Drawing Figures

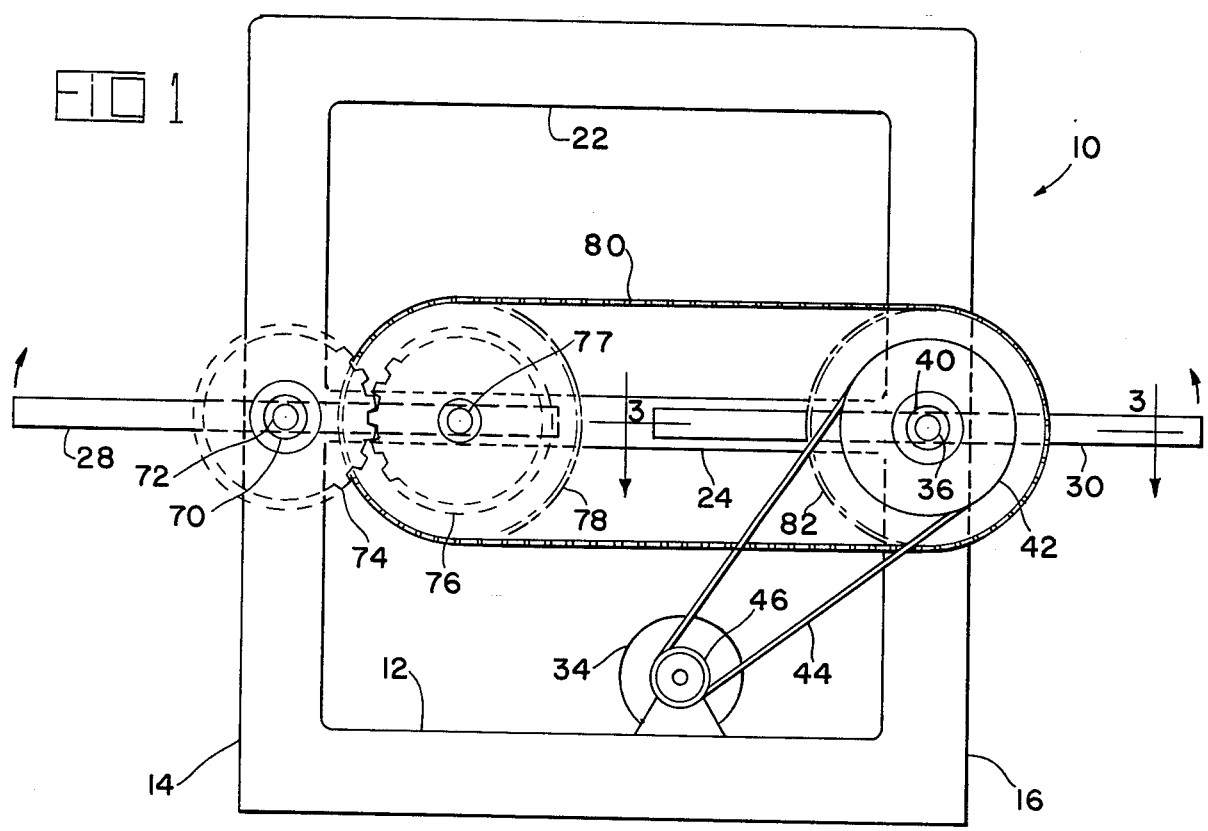
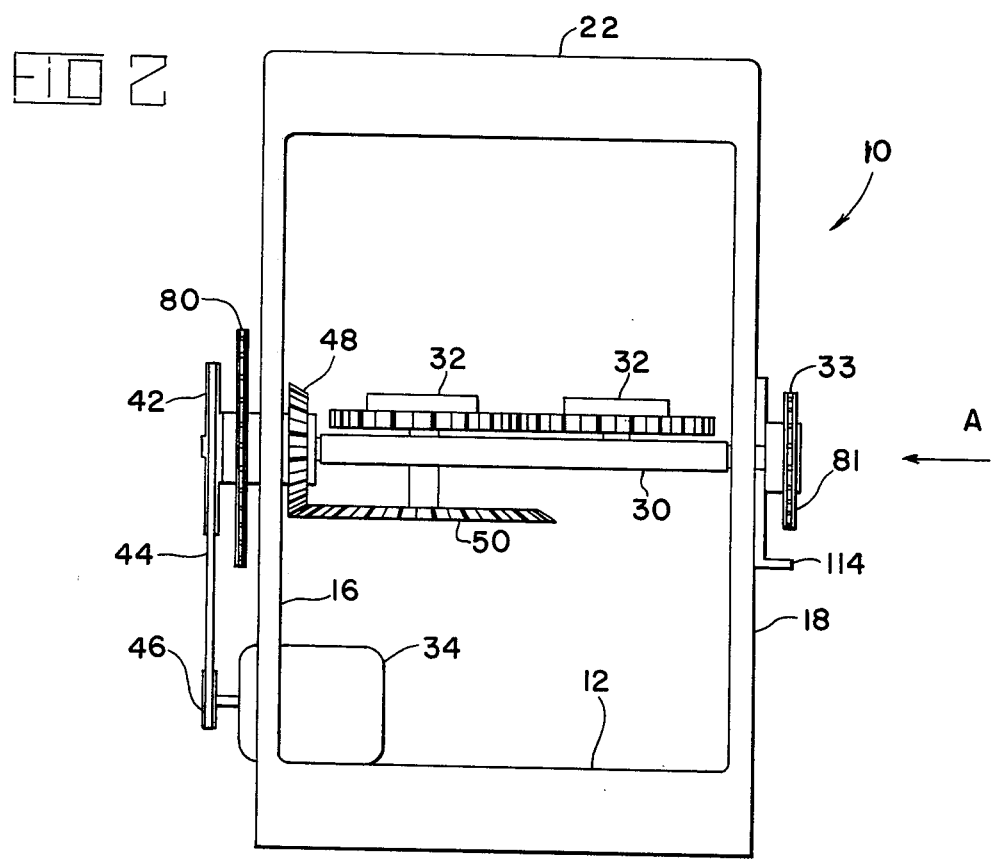

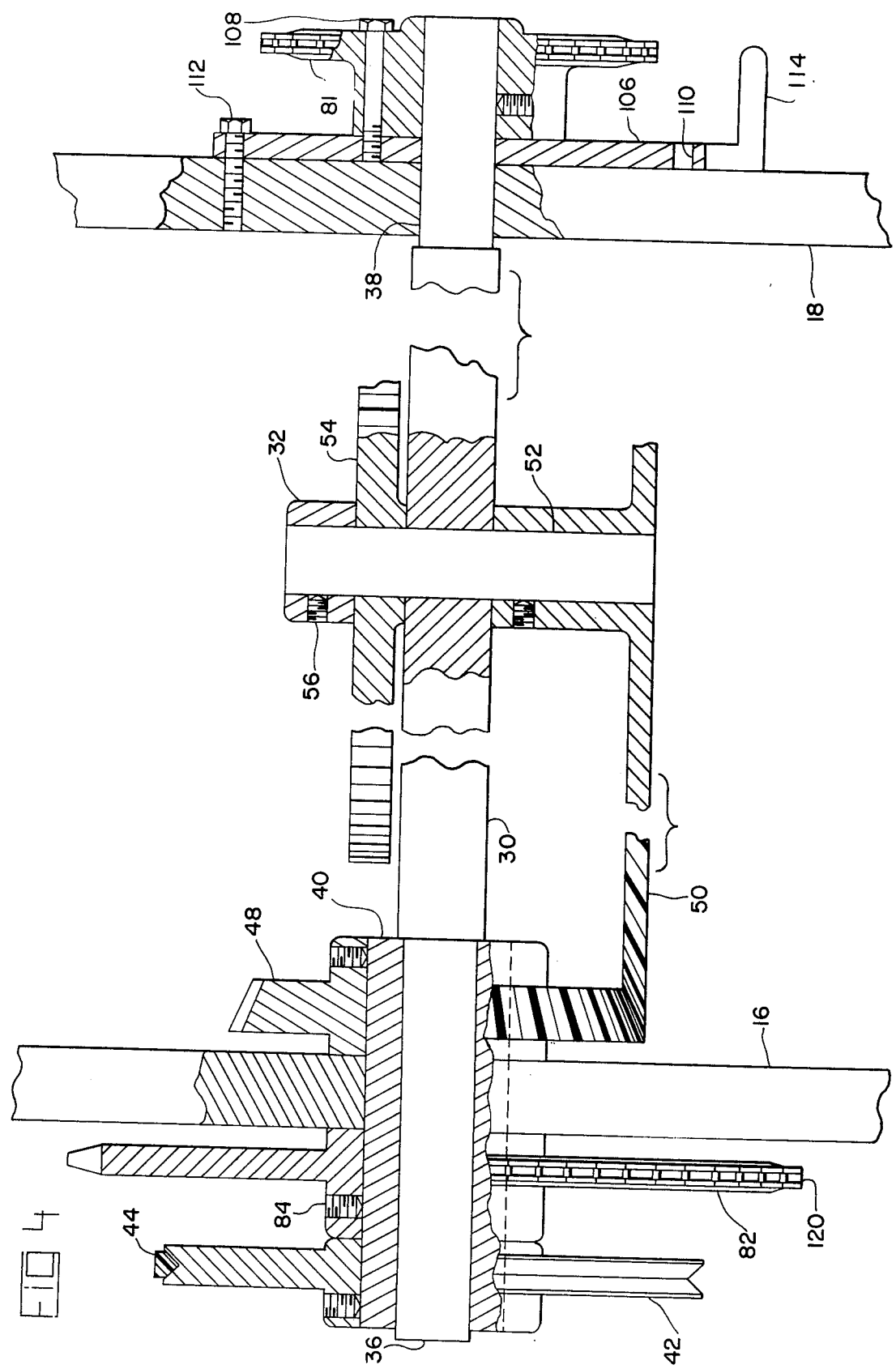

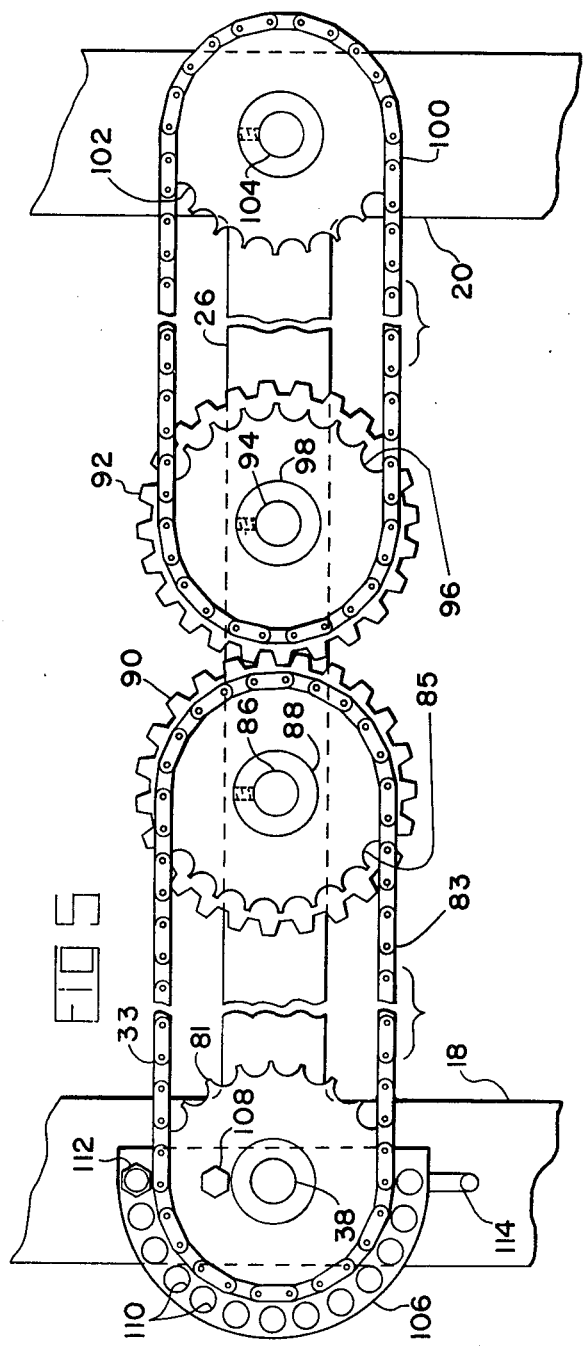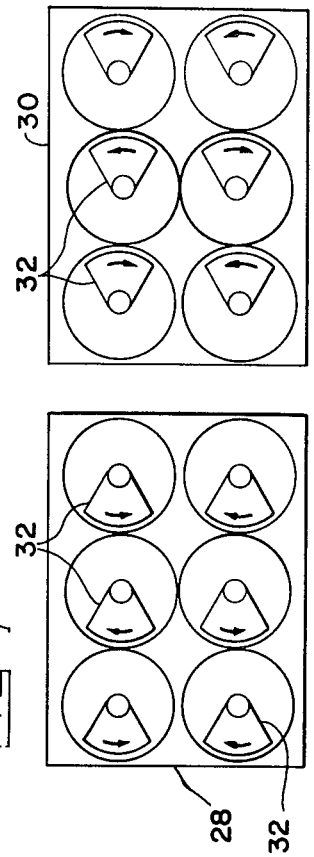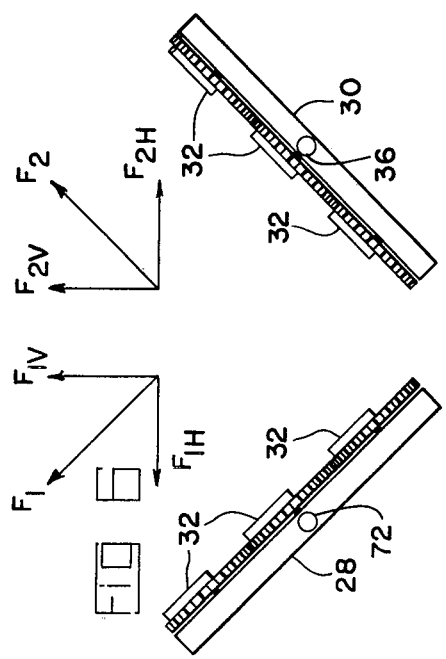

DEVICES FOR PRODUCING VIBRATORY FORCES

The present invention relates to improvements in devices for producing vibratory forces.

Vibratory forces applied in a controlled fashion find utility in many different applications, as for example, agitating or settling fluent materials. A shortcoming of prior devices for such purposes has been the limited ability to adjust the magnitude of the vibratory force. Prior art devices are generally based on the use of rotating weights or other means of moving weights in a closed path of travel to set up centrifugal forces which produce the desired vibrations. The magnitude of the vibratory force can, of course, be varied by changing the size or number of weights employed, but this is relatively time consuming and also makes difficult obtaining a fine regulation of the vibratory forces.

Accordingly the object of the present invention is to overcome this shortcoming and more particularly to provide an improved device for producing vibratory forces which is characterized by its capability of being adjusted quickly and readily to vary the magnitude of the vibratory forces produced.

Another object of the present invention is to provide such an improved device for producing forces which can be adjusted when in operation to obtain a dynamically controlled magnitude of the vibratory forces to meet specific or varying requirements.

These ends are broadly attained through the provision of a device which comprises a structural frame on which a pair of plates are pivotally mounted. Eccentric weight means are mounted on each of these plates for movement in a closed path of travel. Means are employed to move these weight means between extreme outward and inward positions to induce centrifugal forces of the weights relative to the plates. Through the provision of means for pivoting these plates between aligned positions and parallel positions the centrifugal forces may be nullified or progressively increased to a maximum value which is dependent on the physical and dynamic characteristics of the device.

Preferably the means for pivoting the plates have the capability of pivoting them simultaneously and synchronously in opposite directions. Further advantage, particularly in adjusting the vibratory forces during operation of the device is found in the use of trunnions to mount the plates on uprights of the structural frame. The weight means are then driven through the journals for one of the trunnions for each of the plates. This enables manual lever means to be secured to the other trunnion of one plate and a mechanical interconnection made with the other trunnion of the other plate to enable adjustment of the angular positions of the two plates, particular while the device is in operation.

Another preferred feature of the invention is found in the provision of gears which are rotatable on the plates with weights secured thereto. These gears are then rotated so that the weights, through centrifugal forces generate the desired vibratory forces.

The above and other related objects and features of the invention will be apparent from a reading of the following description of the disclosure of a preferred embodiment, with reference to the accompanying drawings, and the novelty thereof pointed out in the appended claims. In the drawings:

FIG. 1 is a front view of a device for producing vibratory forces, emboding my invention;

FIG. 2 is a side view of the device seen in FIG. 1;

FIG. 4 is a view, on a further and larger scale, taken on line 4—4 in FIG. 3, with portions thereof broken away;

FIG. 5 is a fragmentary view of the rear side of the vibrating device seen in FIG. 1 and looking in the direction of arrow A in FIG. 2;

FIG. 6 is a simplified view of weight plates employed herein adjusted to an intermediate position; and FIG. 7 is a plan view of the weight plates in FIG. 6, adjusted to aligned positions and showing the relative directions of rotation of the weights employed herein to obtain controlled vibrations.

Figure 3:
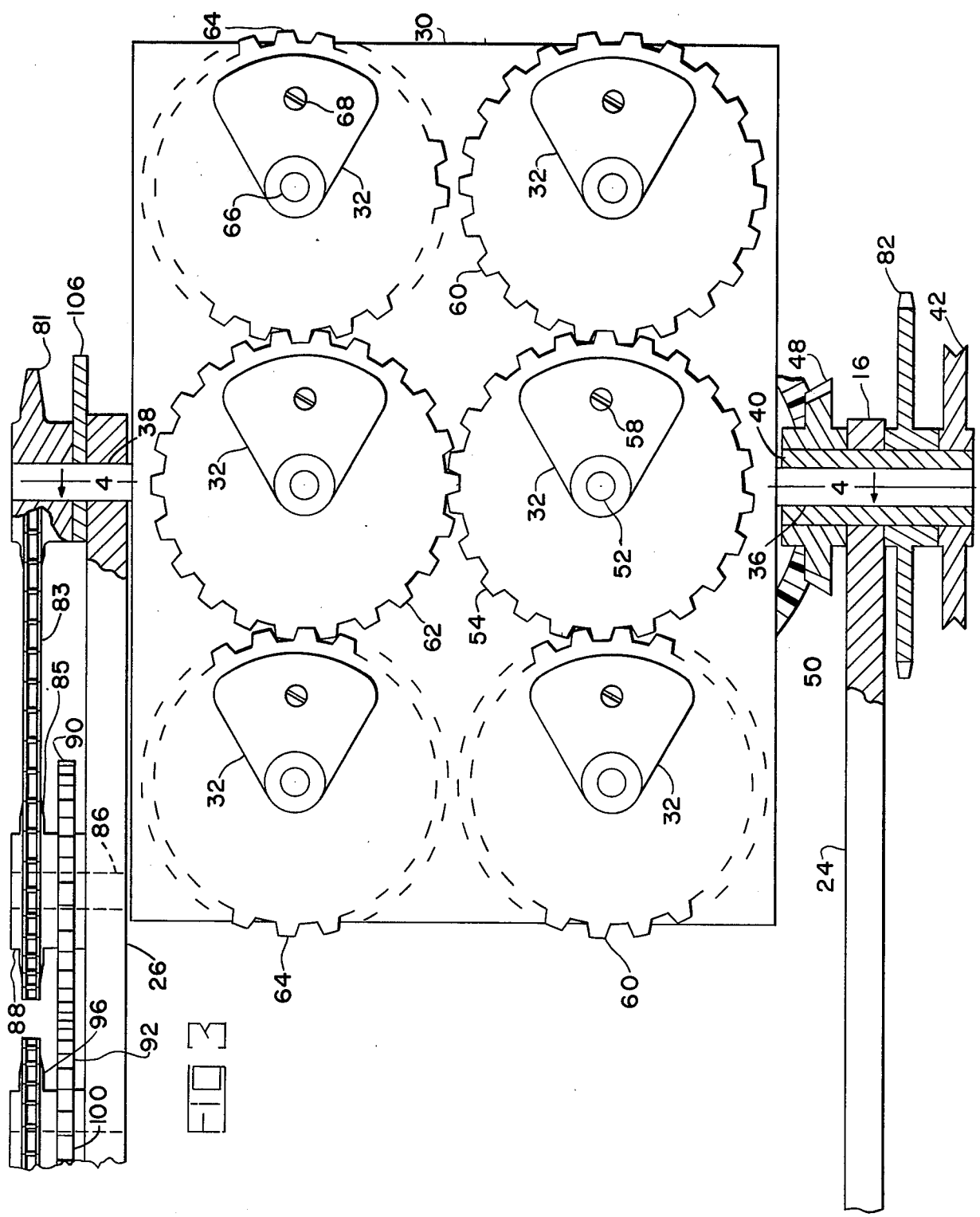
FIG. 3 is a view, on an enlarged scale, section taken generally on line 3—3 in FIG. 1.

The present vibrating device employs a structural frame, herein illustrated as a casting, indicated generally by reference character 10. The frame 10 comprises a generally rectangular base 12 having uprights 14, 16, 18 and 20. These uprights are interconnected by horizontal members 22 at their upper ends and by horizontal members 24, 26 extending between the front uprights 14, 16 and rear uprights 18, 20 respectively.

The frame 10 supports a pair of weight plates 28 and 30 which are pivotally mounted on the left hand uprights 14, 20 and the right hand uprights 16, 18, respectively.

The weights plates 28, 30 are diagramatically shown in FIGS. 6 and 7, with eccentric weights 32 mounted thereon for synchronous rotations in the directions indicated. Movement of the weights in their closed paths of travel sets up centrifugal forces which produce a controlled vibratory force in a vertical direction. The magnitude of such vibratory force is a function of the angular positions to which the plates 28 and 30 are pivotally adjusted. The maximum vibratory force is produced when the plates 28, 30 are parallel. The vibratory force is progressively reduced as the plates are brought to aligned positions where vibratory forces are essentially nullified. All of this will be more apparent from the following detailed description.

An electrical motor 34 is mounted on the frame base 12 and rotates the weights 32 through the drive train now to be described. The plate 30 is provided with oppositely extending trunnions 36 and 38 (FIGS. 3 and 4). The front trunnion 36 is pivotally within a sleeve 40 which is journaled on the front upright 16. A pulley 42 (See also FIGS. 1 and 2) is secured to the outer end of the sleeve 40 and drivingly connected by a V-belt 44 to a pulley 46 secured to the output shaft of the motor 34. A bevel gear 48 is secured to the inner end of the sleeve 40 and meshes with a second bevel gear 50 secured to a shaft 52 which is journalized in the plate 30.

A spur gear 54 is secured to the shaft 52 on the upper surface of the plate 30. One of the weights 32 is secured to the shaft 42 by a set screw 56 and then held in fixed angular relationship to the gear 54 by a screw 58. The gears 50 and 54 and the weight 32 are thus held in assembled relationship in an axial sense and in a predetermined angular sense. The remainder of the weights 32 on the plate 30 are mounted on gears which are driven, in synchronism from the gear 54. Thus, gears 50 mesh with the gear 54 on opposite, lateral sides. Gear 62 is disposed to the rear of and meshes with the gear 54. Gears 64 are disposed on opposite, lateral sides of the gear 62 and mesh therewith. The gears 60, 62 and 54 are rotatably mounted on stub shafts 66 projecting upwardly from the plate 30 and the weights 32 mounted respectively thereon are held in fixed angular relationship relative thereto by a screws 68 which function similarly to the screw 58.

The weight plate 28 and the mounting of the weights 32 thereon is identical with that described in connection with the plate 30 except for the orientation of the weights 32 being directed in an opposite direction as indicated in FIG. 7. Thus there is a drive connection from the several spur gears on the left hand plate 28 through a set of bevel gears corresponding to the gears 48 and 50 just described, which provide a rotating drive connection with a sleeve 70 (FIG. 1) which rotates on the left hand plate trunnion 72 and is journaled in the left hand, front frame member 14. A spur gear 74 is secured to the sleeve 70 and meshes with a gear 76 of the same diameter which is journaled on a stub shaft 77 projecting outwardly from the horizontal frame member 24. The gear 76 is formed integrally with sprocket 78 which is connected through a chain 80 to a sprocket 82 of the same diameter (See also FIG. 4) that is drivingly secured to the sleeve 40 by a set screw 84.

It will be apparent that with the motor 34 energized the drive connection through the sleeve 40, and bevel gears 48 and 50 cause the gears 54, 60, 52 and 64 to rotate at a given rate and for the weights 32 on the plate 30 to thus rotate in synchronism.

Similarly the drive connection through the chain 80 and gears 76 and 74 provide a rotative input to the sleeve 70 in a direction opposite to that of the sleeve 40 and the gears and weights 32 on the left hand plate 28 are thus rotated synchronously with each other and also synchronously with the weights of the plate 30, but in opposite directions, again as is indicated in FIG. 7.

Stated, more generically, the described drive mechanism provides means for moving the eccentric weight means through closed paths of travel between extreme inward and outward positions, the outward position being illustrated in FIG. 7.

As was previously indicated the weight plates 28 and 30 may be pivoted from the horizontal positions illustrated in FIG. 1 to vertical positions in order to control the direction and intensity of the vibratory forces produced. To this end, a sprocket 81 (FIGS. 3, 4 and 5) is secured to the rear trunnion 38 of the right hand weight plate 30. The sprocket 81 is connected by a chain 83 to a sprocket 85 of the same diameter which is journaled on a stub shaft 86 projecting from the rear horizontal frame member 26 being held thereon in an axial direction by a collar 88. The sprocket 85 is formed integrally with a gear 90 which meshes with a gear 92 of the same diameter mounted on a stub shaft 94, also projecting from the horizontal frame member 26. Similarly, a sprocket 96 is formed integrally with the gear 92 and held axially on the stub shaft 94 by a collar 98. The sprocket 96 is connected by a chain 100 to a sprocket 102, of the same diameter, which is secured to the rear trunnion 104 of the left hand weight plate 28.

An indexing plate 106 is secured to the sprocket 80 by a screw 108 and is provided with a plurality of holes 110 around its semi-circular periphery. The index plate 106 is held in a selected angular position relative to the rear frame member 18 by a screw 112 extending through one of the holes 110 and threaded into the upright 18. An outbent tab 114 is provided on the index plate 106 to register a selected hole 110 with the threaded opening in the upright 18 for the screw 112.

It will be apparent that, with the mechanism just described, the weight plates 28 and 30 may be simultaneously rotated in opposite directions through an equal angular extent by removing the screw 112 and swinging the plate 106 to bring the weight plates to a desired position where upon the screw 112 may be inserted through one of the holes 110 to maintain the weight plates in their adjusted angular positions.

The described device has the capability of producing a desired magnitude of vibratory forces in a vertical direction within the physical characteristics of the device itself. This is to say that the magnitude of vibratory force will be a function of the value of the weights 32 as well as their distance from the centers of rotation of the gears on which they are mounted, all of which is known to those skilled in the art as being parameters employed in determining centrifugal forces. The present device has the capability of varying the maximum vibratory force through the use of weights of different values, as would other devices for the same general purpose. The magnitude of the centrifugal forces, and more importantly the frequency of the vibrations produced, is a function of the rate of rotation of the gears on which the weights 32 are mounted and again can be controlled in desired fashion in accordance with known teachings.

The novel characteristics of the present device are found in the arrangement of the weights to produce centrifugal forces in planes parallel to the plates 28 and 30 and further in the fact that these forces are in opposite directions when the plates are aligned, which is when the plates are in horizontal positions in the preferred embodiment described. As the weights on the two plates simultaneously and synchronously rotate to move toward and away from each other, the centrifugal forces thus induced in a horizontal direction (in the plane of the drawing in FIG. 1) are cancelled, or nullified. Further, the arrangement of the eccentric weights in three rows on each plate and the directions of movement indicated, tend to minimize, if not fully cancel out vibratory forces in the other horizontal plane, which would be normal to the drawing sheet in FIG. 1.

As indicated, when the plates are in their horizontal positions, i.e., aligned, there is essentially no vibratory force produced by the device when it is in operation. As the plates 28 and 30 are pivoted in opposite directions and to equal angular extents, by the index 114 (upon removal of the screw 112), the centrifugal forces induced are cancelled only to the extent that they possess horizontal components. This is illustrated in FIG. 6 where the plates 28 and 30 have been pivoted to positions 45° from the vertical. The centrifugal forces induced on the plates 28 and 30 are represented by the vectors $F_1$ and $F_2$ respectively which have horizontal components $F_{1H}$ and $F_{2H}$ which are of equal magnitude, but of opposite direction and are therefore cancelled out. The vertical components are represented by the vectors $F_{1V}$ and $F_{2V}$ and are both in an upward direction, thereby producing vibratory forces in a vertical direction of a lesser magnitude that the individual forces $F_1$ and $F_2$. It thus becomes apparent that by pivoting the plates 28 and 30 to parallel positions the vertical vectors will be progressively increased until the vertical components will equal the induced centrifugal forces and the vibratory forces in a vertical direction produced by the device will be at a maximum value.

It will be seen that the plates 28 and 30 may be pivoted while the device is in operation and the weights 32 are rotating to generate centrifugal forces. This enables an operator to obtain a desired vibratory force under dynamic conditions to accurately control agitation of fluent materials or in other uses of the device where the vibrations are employed to effectuate movement of the like of materials. While use of the described index plate 106 provides for incremental adjustment of the vibratory forces, this is simply a matter of convenience and the adjustment could readily be made infinite, if desired.

While a specific, preferred embodiment has been disclosed herein, variations therein will occur to those skilled in the art within the spirit and scope of the present inventive concepts, which, therefore, are to be derived solely from the following claims.

Having thus described the invention, what is claimed as novel and desired to be secured by Letters Patent of the United States is:

1. A device for producing vibratory forces of variable intensity, said device comprising
    a structural frame,
    a pair of plates pivotally mounted on said frame,
    eccentric weight means mounted on each of said plates for movement in a closed path of travel,
    means for synchronously moving both of said weight means between extreme outward positions and extreme inward positions, and
    means for pivoting said plates between positions in which they are aligned with each other and the vibratory forces produced by the moving eccentric weight means are nullified and positions wherein the plates are parallel and the vibratory forces produced by the moving weight means are at a maximum.

2. A device as in claim 1 wherein
    the means for pivoting said plates, including means for simultaneously and synchronously pivoting said plates in opposite between aligned and parallel positions.

3. A device as in claim 1 wherein
    the eccentric weight means comprise, on each plate, at least one weight mounted for rotation about a fixed axis normal to the surface of the plate.

4. A device as in claim 1 wherein
    the means for moving said weight means comprise a plurality of gears mounted on each of said plates for rotation about axis normal thereto, with means providing a power input to one of the gears on each plate, with the remaining gears on each plate being driven from the gear provided with a power input, and
    said weight means comprising weights mounted on said gears in offset relation from their axes of rotation.

5. A device as in claim 4 wherein
    the gears on each plate comprise a central row of two gears having their axes intersecting the pivot axis of the plate and a row of two gears on each side of the central row of gears, and the gears to which the drive input is provided rotate in opposite directions and mesh with the other gear in the central row of gears and the gears of the outer rows of gears mesh, respectively with one of the gears of the central row to be driven thereby.

6. A device as in claim 5 wherein
    the structural frame comprises two pairs of uprights,
    each of said plates has a pair of trunnions projecting in opposite directions, on a common axis, and said trunnions are journaled on said uprights to provide the pivotal mounting of said plates,
    a bevel gear is journaled on one trunnion of each plate and also on the upright on one side of the structural frame, providing for rotation of both the bevel gears and pivoting of the trunnions relative to said uprights,
    a rotary power source is mounted on the structural frame and drivingly connected to the bevel gear mounted on the trunnion of one of said plates,
    means are provided for driving the gear on the trunnion of the other of said plates in the direction opposite the direction of rotation of the gear, on the trunnion of the first plate,
    the gears of each plate to which a drive input is provided are mounted on the upper sides of their respective plates and have shaft means journaled on the plates and connected to second bevel gears beneath the plates which mesh respectively with the said bevel gears thereby providing the means for synchronously moving both of the weight means between extreme outward positions and extreme inward positions.

7. A device as in claim 2 wherein
    the structural frame comprises a pair of uprights,
    each of said plates has a pair of trunnions projecting in opposite directions on a common axis and said trunnions are journaled, respectively on a pair of said uprights, thereby providing the pivotal mounting of said plates,
    and the means for moving both of said eccentric weight means between extreme outward positions and extreme inward positions includes drive means concentric of the journals for the trunnions on one side of said plates, and
    the means for simultaneously and synchronously pivoting said plates in opposite directions include manually operated lever means connected to the trunnion projecting from the other side of one of said plates to enable pivoting of said one plate to a desired angular position, and means interconnecting the trunnion to which the lever means is connected with the trunnion projecting from the other side of the other of said plates for imparting pivotal movement thereto of the same angular extent as imparted by the lever means to said one plate, but in the opposite direction.

8. A device as in claim 7 wherein the interconnecting means comprise a first sprocket secured to the trunnion to which the lever means is connected, second and third sprockets pivotally mounted on the structural frame and a fourth sprocket secured to the other trunnion of said other plate, and first and second sprockets being of the same diameter and drivingly interconnected by a chain, said third and fourth sprockets being of the same diameter and drivingly interconnected by a chain, and a pair of meshing spur gears, respectively connected to and rotating on the same axes as the second and third sprockets,
    and further wherein
    a bevel gear is journaled on one trunnion of each plate and also on the upright on one side of the structural frame, providing for rotation of the bevel gear and pivoting of said one trunnion relative to said uprights,
    a rotary power source is mounted on the structural frame and drivingly connected to the bevel gear journaled on the trunnion of one of said plates,
    means are provided for driving the bevel gear on the trunnion of the other of said plates in the direction opposite the direction the gear on the trunnion of the first plate is driven, and the gears of each plate to which a drive input is provided are mounted on the upper sides of their respective plates and have shaft means journaled on the plates and connected to second bevel gears beneath the plates which mesh respectively with the said first bevel gears thereby providing the means for synchronously moving both of the weight means between extreme outward positions and extreme inward positions.

* * * * *